US010291666B2

(12) United States Patent
Gupta et al.

(10) Patent No.: US 10,291,666 B2
(45) Date of Patent: May 14, 2019

(54) METHOD AND APPARATUS FOR TEMPORARILY PRIORITIZING CONTACTS BASED ON CONTEXT

(71) Applicant: Motorola Mobility LLC, Chicago, IL (US)

(72) Inventors: Mayank Gupta, Bangalore (IN); Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 584 days.

(21) Appl. No.: 14/930,818

(22) Filed: Nov. 3, 2015

(65) Prior Publication Data

US 2017/0126753 A1 May 4, 2017

(51) Int. Cl.
*G06Q 10/00* (2012.01)
*H04L 29/06* (2006.01)
*G06Q 10/10* (2012.01)
*H04L 12/58* (2006.01)

(52) U.S. Cl.
CPC ....... *H04L 65/403* (2013.01); *G06Q 10/1095* (2013.01); *H04L 51/26* (2013.01)

(58) Field of Classification Search
CPC ......... G06Q 10/00; G06Q 40/06; G06F 17/60
USPC ......................................................... 705/7.19
See application file for complete search history.

(56) References Cited

U.S. PATENT DOCUMENTS

| | | | | |
|---|---|---|---|---|
| 8,384,549 | B2 * | 2/2013 | Lemmon | G08B 27/00 340/3.1 |
| 2002/0116541 | A1 * | 8/2002 | Parker | G06F 15/02 719/318 |
| 2005/0119927 | A1 * | 6/2005 | Patel | G06Q 10/109 705/7.19 |
| 2008/0243582 | A1 * | 10/2008 | Chen | G06Q 10/06314 705/7.19 |
| 2010/0010855 | A1 * | 1/2010 | Cheng | G06Q 10/06311 705/7.13 |
| 2016/0189110 | A1 * | 6/2016 | Bombolowsky | G06Q 10/1095 705/7.19 |

OTHER PUBLICATIONS

Motorola Mobility LLC, "Motorola Assist", https://play.google.com/store/apps/details?id=com.motorola.contextual.smartrules2&hl=en, Nov. 3, 2015, 3 pages.

* cited by examiner

*Primary Examiner* — Romain Jeanty
(74) *Attorney, Agent, or Firm* — Wolfe-SMBC

(57) ABSTRACT

A method and apparatus for prioritizing contacts based on context includes an electronic device configured to detect a meeting for a user of the electronic device, wherein the meeting is scheduled for a meeting time interval, and to determine a participant of the meeting. The electronic device is further configured to temporarily make a contact for the participant a priority contact during the meeting time interval and to enable a meeting mode on the first electronic device during the meeting time interval. An audible alert on the electronic device is enabled for the priority contact and disabled for non-priority contacts while the meeting mode is enabled.

20 Claims, 5 Drawing Sheets

500

FIELDS

RECORDS

| 502 CONTACT ID | 504 TYPE | 506 DATA VALUE |
|---|---|---|
| 522 3822 524 | PERSONAL HOME 526 | (630) 858-4378 528 |
| 532 3822 534 | PERSONAL CELL 536 | (630) 469-8129 538 |
| 542 3822 544 | WORK PHONE 546 | (312) 225-7000 EXT. 173 548 |
| 552 3822 554 | PERSONAL E-MAIL 556 | mike512@gmail.com 558 |
| 562 3822 564 | WORK E-MAIL 566 | mike.s@omnitech.com 568 |
| 572 3822 574 | PERSONAL WEBSITE 576 | www.facebook.com/mike.smith 578 |
| 582 3822 584 | PROFESSIONAL WEBSITE 586 | www.linkedin.com/mike.smith 588 |

FIG. 5

METHOD AND APPARATUS FOR TEMPORARILY PRIORITIZING CONTACTS BASED ON CONTEXT

FIELD OF THE DISCLOSURE

The present disclosure relates generally to an electronic device managing contact priorities and more particularly to the electronic device temporarily prioritizing one or more contacts based on context while a limited-interruption mode is enabled on the electronic device.

BACKGROUND

Modern electronic computing devices are being programmed with sophisticated software and firmware, which allows users of those devices to specify certain events or times during which they should not be disturbed by the devices. This, however, makes the users less accessible and less likely to receive important communications in an acceptable time frame.

BRIEF DESCRIPTION OF THE FIGURES

The accompanying figures, where like reference numbers refer to identical or functionally similar elements throughout the separate views, form part of the specification and illustrate embodiments in accordance with the included claims.

FIG. 5 shows a contact on an electronic device, in accordance with some embodiments.

Figure 1:
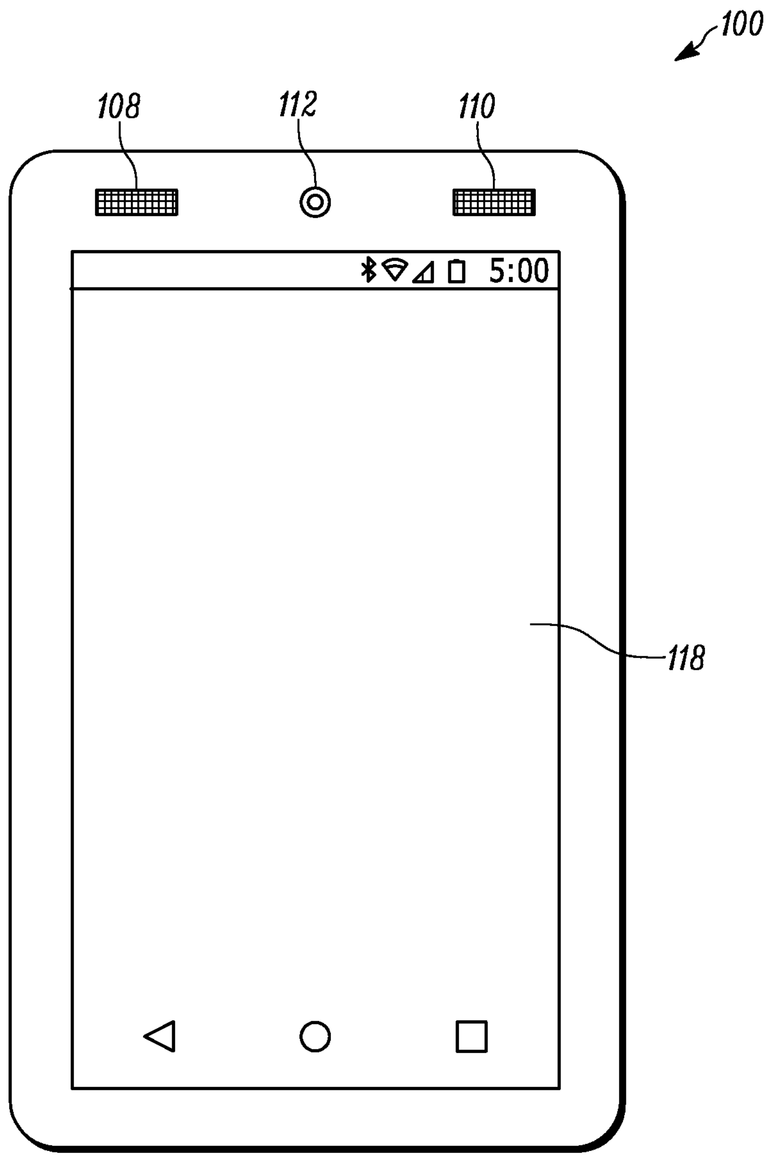
FIG. 1 shows an electronic computing device, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present teachings. In addition, the description and drawings do not necessarily require the order presented. It will be further appreciated that certain actions and/or steps may be described or depicted in a particular order of occurrence while those skilled in the art will understand that such specificity with respect to sequence is not actually required.

The method and device components have been represented, where appropriate, by conventional symbols in the drawings, showing only those specific details that are pertinent to understanding the embodiments of the present teachings so as not to obscure the disclosure with details that will be readily apparent to those of ordinary skill in the art having the benefit of the description herein.

DETAILED DESCRIPTION

Generally speaking, pursuant to various embodiments described herein, the present disclosure provides a method and apparatus for managing contact priorities. More specifically, an electronic device temporarily prioritizes one or more contacts based on context while a limited-interruption mode is enabled on the electronic device. This makes a user of the electronic device more accessible to individuals associated with the prioritized contacts while the limited-interruption mode is enabled on the electronic device.

In accordance with the teachings herein, a method performed by an electronic device for temporarily prioritizing contacts includes detecting a meeting for a user of the electronic device, wherein the meeting is scheduled for a meeting time interval, and determining a participant of the meeting. The method further includes temporarily making a contact for the participant a priority contact during the meeting time interval and enabling a meeting mode on the first electronic device during the meeting time interval. An audible alert on the electronic device is enabled for the priority contact and disabled for non-priority contacts while the meeting mode is enabled.

In an embodiment, the electronic device also determines an additional participant of the meeting and temporarily makes a contact for the additional participant a priority contact during the meeting time interval. The audible alert on the first electronic device is enabled for both the initial priority contact and the additional priority contact while the meeting mode is enabled.

Also in accordance with the teachings herein is an electronic device configured to temporarily prioritize contacts and having a processing element. The processing element is configured to detect a meeting for a user of the electronic device scheduled for a meeting time interval and to determine a participant of the meeting. The processing element is further configured to temporarily make a contact for the participant a priority contact during the meeting time interval and to enable a meeting mode on the electronic device during the meeting time interval. An audible alert on the electronic device is enabled for the priority contact and disabled for non-priority contacts while the meeting mode is enabled.

In an embodiment, the electronic device includes at least one communication interface configured to send and receive electronic communications. The processing element is operatively coupled to the at least one communication interface and additionally configured to detect the meeting and determine the participant by parsing an electronic communication sent to or received from another electronic device.

In another embodiment, the at least one communication interface is configured to receive an electronic communication from another electronic device associated with a service provider and concerning a pending service being provided to the user. The processing element, which is operatively coupled to the at least one communication interface, is additionally configured to determine, from the electronic communication, contact information for the service provider. The processor is also configured to temporarily make another contact including the contact information an additional priority contact during the meeting time interval. The audible alert on the electronic device is enabled for the additional priority contact while the meeting mode is enabled.

An electronic device, also referred to simply as a device, is any device configured for a limited-interruption mode. A non-exhaustive list of electronic devices consistent with described embodiments includes smartphones, smartwatches, phablets, tablets, laptops, personal digital assistants, enterprise digital assistants, and other portable devices configured to receive electronic communications.

A limited-interruption mode is a state of operation that selectively suppresses audible alerts on the device that result from receiving electronic communications from individuals using other devices. A device is in a limited-interruption mode, for example, while a user of the device is sleeping and the device disables an audible ringtone that would otherwise play when the device receives a call from another device. This allows the user to continue sleeping uninterrupted. In another example, a limited-interruption mode stops the device from playing a voice notification over its speaker that would otherwise announce: "You received a new message from Mike. To listen, say 'listen.'"

A meeting mode is a particular limited-interruption mode enabled on a device while a user of the device is in a meeting. In the meeting mode, the device selectively suppresses audible alerts on the device during a meeting time interval. For example, the device disables an audible chime during a meeting time interval which would otherwise play when the device receives a text message from another device. This prevents the user and the meeting from being interrupted while the meeting is in progress.

A meeting time interval is a period of time for which a meeting is scheduled or for which the meeting occurs. For example, a meeting time interval begins at 10:00 AM and continues to 11:00 AM for a one-hour meeting scheduled to occur between 10:00 AM and 11:00 AM. In a further example, the meeting time interval continues to 11:30 AM, thirty minutes past the scheduled end of the meeting, when the meeting continues to 11:30 AM.

A limited-interruption mode can be enabled and/or disabled on an electronic device either automatically, without user input, or manually, with user input. In a first example, a device determines from a calendar application that a one-hour meeting is scheduled to occur between 10:00 AM and 11:00 AM. At 10:00 AM, as determined from a clock included in the device, the device enables a meeting mode without user input. At 11:00 AM, the device disables the meeting mode without user input. In a second example, a user of the device interacts with the device at 10:00 AM to enable the meeting mode and again interacts with the device at 11:00 AM to disable the meeting mode. In a third example, the device automatically enables the meeting mode at 10:00 AM and the user manually disables the meeting mode at 10:45 AM when the meeting ends 15 minutes early.

FIG. 1 shows an electronic device, specifically a smartphone 100, which is referred to in describing included embodiments. The smartphone 100 is shown with a number of components, namely: left 108 and right 110 stereo speakers; a camera 112, and a display 118. These components 108, 110, 112, 118 enable the smartphone 100 to function in accordance with described embodiments. In other embodiments, different electronic devices having similar components are used to perform the functionality described herein with respect to the smartphone 100. These electronic devices and their included components are represented by and described with reference to FIG. 2.

Figure 2:
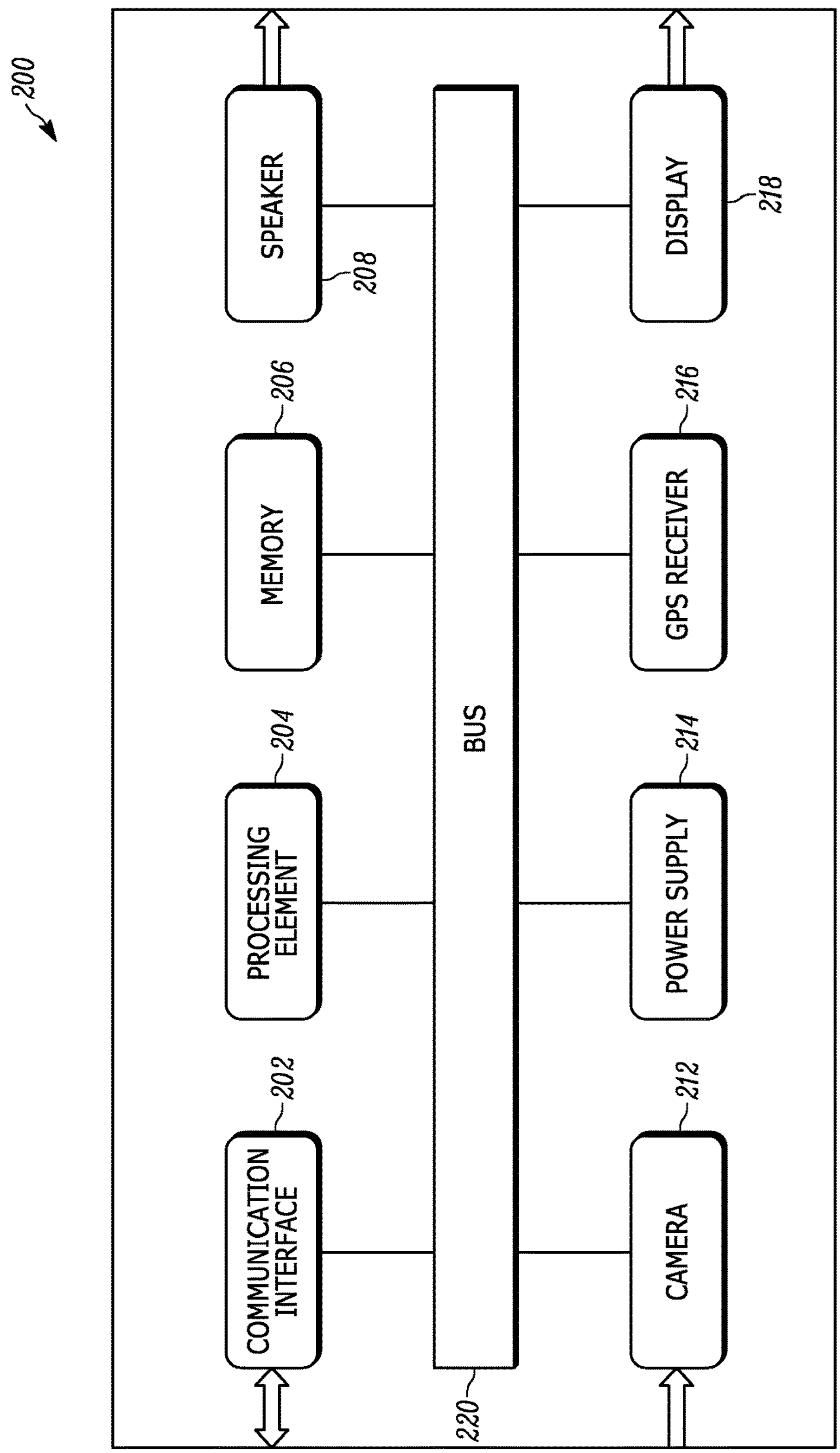
FIG. 2 shows a block diagram of an electronic computing device, in accordance with some embodiments.

FIG. 2 shows a block diagram of a nonspecific electronic device 200 in accordance with embodiments of the present teachings. For a particular embodiment, the electronic device 200 represents the smartphone 100. Included within the electronic device 200 are a communication interface 202, a processing element 204, memory 206, a speaker 208, a camera 212, a power supply 214, a global positioning system (GPS) receiver 216, and a display 218, which are all operationally interconnected by a bus 220.

A limited number of device components 202, 204, 206, 208, 212, 214, 216, 218, 220 are shown within the electronic device 200 for ease of illustration. Other embodiments may include a lesser or greater number of components in an electronic device. Moreover, other components needed for a commercial embodiment of an electronic device that incorporates the components 202, 204, 206, 208, 212, 214, 216, 218, 220 shown for the electronic device 200 are omitted from FIG. 2 for clarity in describing the enclosed embodiments.

The processing element 204, for instance, includes arithmetic logic and control circuitry necessary to perform the digital processing, in whole or in part, for the electronic device 200 to determine participants for a meeting and to perform functionality in accordance with described embodiments for the present teachings. For one embodiment, the processing element 204 represents a primary microprocessor, also referred to as a central processing unit (CPU), of the electronic device 200. For example, the processing element 204 can represent an application processor of a tablet. In another embodiment, the processing element 204 is an ancillary processor, separate from the CPU, wherein the ancillary processor is dedicated to providing the processing capability, in whole or in part, needed for the components 202, 204, 206, 208, 212, 214, 216, 218, 220 of the electronic device 200 to perform at least some of their intended functionality.

The memory 206 provides storage of electronic data used by the processing element 204 in performing its functionality. For example, the processing element 204 can use the memory 206 to load programs and/or store files associated with determining a meeting time interval and enabling a meeting mode. In one embodiment, the memory 206 represents random access memory (RAM). In other embodiments, the memory 206 represents volatile or non-volatile memory. For a particular embodiment, a portion of the memory 206 is removable. For example, the processing element 204 can use RAM to cache data while it uses a micro secure digital (microSD) card to store files associated with functionality performed in conjunction with a meeting mode.

One or more communication interfaces 202 allow for communication between the electronic device 200 and other electronic devices, such as smartphones or laptops, configured to interact with the electronic device 200 as part of the electronic device 200 performing its described functionality. These other devices, for example, can initiate a phone-to-phone, a computer-to-phone, a phone-to-computer, or a computer-to-computer call to the electronic device 200. The electronic device 200 can also receive text messages, e-mails, and additional electronic communications from other devices.

For one embodiment, the communication interface 202 includes a cellular transceiver to enable the electronic device 200 to receive calls and/or messages from other electronic devices using one or more cellular networks. Cellular networks can use any wireless technology that, for example, enables broadband and Internet Protocol (IP) communications including, but not limited to: $3^{rd}$ Generation (3G) wireless technologies such as CDMA2000 and Universal Mobile Telecommunications System (UMTS) networks; $4^{th}$ Generation (4G) technologies such as LTE and WiMAX; or $5^{th}$ Generation (5G) technologies.

In another embodiment, the communication interface 202 includes a wireless local area network (WLAN) transceiver that allows the electronic device 200 to access the Internet using standards such as Wi-Fi. The WLAN transceiver allows the electronic device 200 to receive radio signals from similarly equipped electronic devices using a wireless distribution method, such as a spread-spectrum or orthogonal frequency-division multiplexing (OFDM) method. For some embodiments, the WLAN transceiver uses an IEEE 802.11 standard to communicate with other electronic devices in the 2.4, 3.6, 5, and 60 GHz frequency bands. In a particular embodiment, the WLAN transceiver uses Wi-Fi interoperability standards as specified by the Wi-Fi Alliance to communicate with other Wi-Fi certified devices.

The GPS receiver 216 is configured to detect where the device 200 is located. For some embodiments, the device 200 determines, using the GPS receiver 216, that it is or is not located where a scheduled meeting is to take place. A calendar application accessible to the device 200, for example, indicates that a meeting is scheduled from 10:00 AM to 11:00 AM within a building located at a particular address. At 10:00 AM, the user of the device 200 arrives at the building with the device 200 and the device 200 enables a meeting mode. At 10:45, the GPS receiver indicates that the user leaves the building and the device 200 responsively disables the meeting mode.

The camera 212 is an input device that allows the device 200 to capture images of its surroundings. The device 200 then processes the captured images, using the processing element 204, for an indication that the device 200 is or is not at a meeting location. In some instances, the device 200 identifies specific objects or a setting from captured images. The captured images are compared against a database of reference images, for example, to determine if a present setting or any objects can be associated with a meeting location. For instance, captured images indicate that the device 200 is in a small room having a plurality of people seated around a table and with a projection screen on a wall.

The speaker 208 and the display 218 are output components of the electronic device 200 that allow the device 200 to interface with a user. In particular, the speaker 208 and the display 218 generate alerts designed to notify the user of incoming calls, messages, or a current status of the device 200. The speaker 208, for example, generates an audible alert in the form of a ringtone to notify the user of an incoming call. The device 200 can also use the speaker 208 to play different audible alerts for different types of messages. An incoming text message, for example, might be accompanied by a default chime, whereas an incoming e-mail is accompanied by a user-selected tone. The display 218 also generates visual alerts in the form of pop-up message windows, for instance, to notify the user of an incoming communication. Visual alerts can notify the user of an incoming communication when audible alerts are silenced while a limited-interruption mode, such as a meeting mode, is enabled on the device 200.

The power supply 214 represents a power source that supplies electric power to the device components 202, 204, 206, 208, 212, 216, 218, and 220, as needed, during the course of their normal operation. The power is supplied to meet the individual voltage and load requirements of the device components 202, 204, 206, 208, 212, 216, 218, 220 that draw electric current. For some embodiments, the power supply 214 is a wired power supply that provides direct current from alternating current using a full- or half-wave rectifier. For other embodiments, the power supply 214 is a battery that powers up and runs a portable electronic device. For a particular embodiment, the battery 214 is a rechargeable power source. A rechargeable power source for an electronic device is configured to be temporarily connected to another power source external to the electronic device to restore a charge of the rechargeable power source when it is depleted or less than fully charged. In another embodiment, the battery is simply replaced when it no longer holds sufficient charge.

Figure 3:
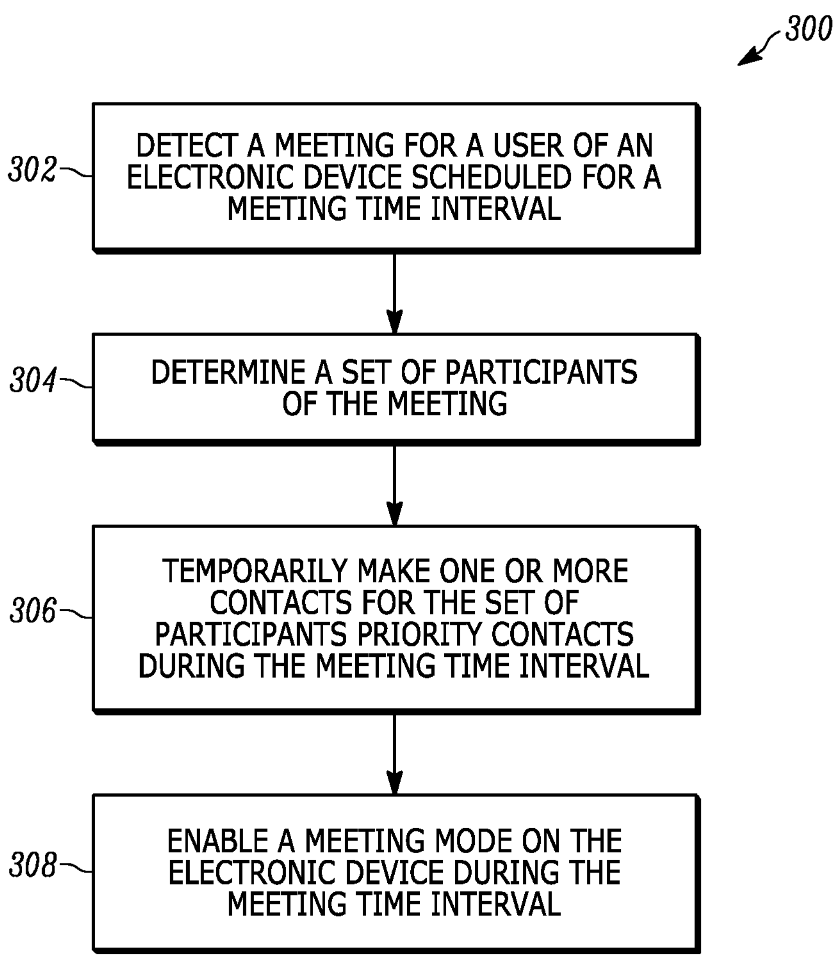
FIG. 3 shows a logical flow diagram illustrating a method for prioritizing contact information based on context, in accordance with some embodiments.

With reference to the remaining figures, a detailed description of the functionality of the components shown in FIGS. 1 and 2 is given. FIG. 3 shows a logical flow diagram illustrating a method 300 performed by an electronic device, taken to be the smartphone 100, to temporarily prioritize contacts based on context. The smartphone 100 is also referred to as a first device 100 and the user of the smartphone 100 is referred to as a first user. Users of other devices are referred to as individuals, and specifically as participants if the individuals are intended attendees of a meeting that includes the first user.

The method 300 begins with the first device 100 detecting 302 a meeting, for the first user, scheduled for a meeting time interval. The first device 100 also determines 304 a set of participants of the meeting. The set of participants can include multiple participants or only a single participant in addition to the first user. Additionally, participants can include individuals who intend to attend a meeting in person and/or remotely in any combination. For example, a first participant will walk to a conference room to attend a meeting in person while a second participant located in another city will use web conferencing software and a networked computer equipped with a camera and microphone to attend the meeting remotely. An illustration of in-person and remote meeting attendance is presented in FIG. 4.

Figure 4:
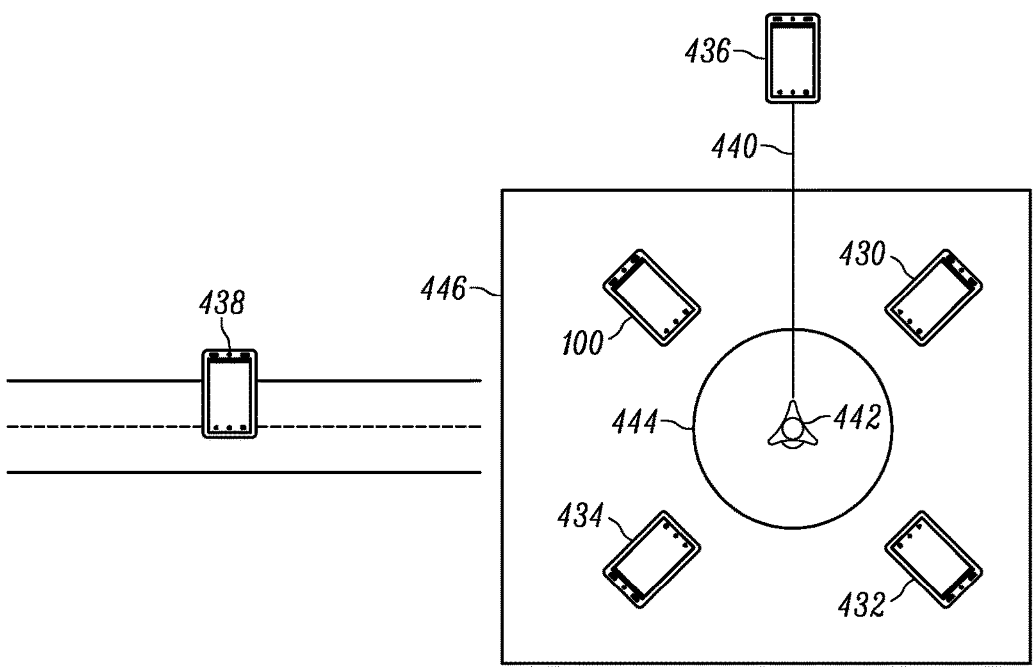
FIG. 4 shows a schematic diagram for prioritizing contact information based on context, in accordance with some embodiments.

FIG. 4 shows the first device 100 together with a second device 430, a third device 432, and a fourth device 434 all located around a conference table 444 in a conference room 446. A participant using a fifth device 436 attends the meeting remotely by using a communication connection 440 that communicatively couples the first device 436 to a conference phone 442 placed on the conference table 444. A participant using a sixth device 438 is delayed by unexpected traffic and fails to arrive at the conference room 446 in time for the meeting. The second device 430, third device 432, fourth device 434, fifth device 436, and sixth device 438 belong to or are being used by a second participant, a third participant, a fourth participant, a fifth participant, and a sixth participant, respectively.

In some instances, the first device 100 detects a meeting for the first user and determines a participant of the meeting by parsing one or more electronic communications, also referred to simply as communications. These communications can include electronic-mail communications (e-mails), electronic-chat communications (chats), and/or a text-message communications (texts). Further, the communications can be incoming communications received from another device, outgoing communications sent to another device, or any combination thereof.

For one embodiment, the first device 100 receives a meeting invitation as an e-mail from the second device 430. From the meeting invitation, the first device 100 detects that a meeting is being scheduled in a week's time from 10:00 AM to 11:00 AM. The first device 100 also determines from the meeting invitation that the second participant will be attending the meeting. In a further embodiment, the first device 100 additionally determines that the third, fourth, fifth, and sixth participants will also be attending the meeting.

For another embodiment, the first device 100 receives a text from the sixth device 438. The first device 100 parses the text, by identifying key words and using contextual filters, for instance, to determine from the text that a meeting is being scheduled in a week's time from 10:00 AM to 11:00 AM. The first device 100 also determines from parsing the text that the sixth participant intends to attend the meeting.

In a further embodiment, the first device 100 additionally determines that the second, third, fourth, and fifth participants are also intended attendees.

In other instances, the first device 100 detects a meeting for the first user and determines a participant of the meeting by accessing a calendar application. The calendar application can be executing on the first device 100 and/or on another electronic device communicatively coupled to the first device 100. For example, the first user installs a mobile calendar application, such as Microsoft Outlook, onto the first device 100 and enters into the calendar application a scheduled meeting and meeting participants. In another embodiment, the first user enters the scheduled meeting into a primary calendar application executing on another electronic device, such as the first user's home or work computer, with which the mobile calendar application periodically synchronizes data. Alternatively, the scheduled meeting is entered into the mobile calendar application by the first device 100 or entered into a primary calendar application executing on another device as the first user accepts a meeting invitation on either the first device 100 or the other device.

In one example, Omnitech Corporation, the employer of the first user and the sixth participant, sets up an exchange server to support online client calendar applications accessible to the first device 100 and sixth device 438 through Internet connections. Schedule information is shared between a first client calendar application, associated with the first user, and a second client calendar application, associated with the sixth participant. By accessing the first client calendar application, the first device 100 determines that the sixth participant is scheduled to attend a meeting with the first user on a particular date and time.

For an alternate embodiment, the first 100 and sixth 438 devices each execute or synchronize with shared calendar applications which directly exchange data without using an exchange server. For instance, the first device 100 has access to a group calendar from which it determines that the sixth participant is scheduled to attend a meeting with the first user.

Returning to FIG. 3, the method 300 continues with the first device 100 temporarily making 306 one or more contacts for the set of participants priority contacts during the meeting time interval. A contact is a collection of one or more contact records, also referred to simply as records, which specify contact information for an individual. Each contact record includes information identifying an electronic means for the individual to communicate with the first device 100 using another electronic device and/or an electronic account. A contact is described in greater detail with reference to FIG. 5.

FIG. 5 shows a contact 500 stored on the first device 100 for an individual Mike Smith in accordance with a particular embodiment. The contact 500 is arranged into three columns 502, 504, 506, with each column representing grouped fields. The contact entry 500 is also arranged into seven rows 522, 532, 542, 552, 562, 572, 582, with each row representing a contact record. For some embodiments, the contact 500, shown as a seven-by-three array, is a view of a larger contacts table which includes additional records for other contacts.

The first column 502 of the contact 500 represents contact-identification (ID) fields. The contact-ID fields, which include the fields 524, 534, 544, 554, 564, 574, and 584, store a unique number for each contact and identify records associated with the contact 500. The contact-ID field for each record of the contact 500 stores the numeric string "3822," identifying the seven records 522, 532, 542, 552, 562, 572, 582 as being for the individual Mike Smith. Although in this example the contact-ID values are numbers, different implementations may use different values, strings, or other types of identifiers to link records that relate to the same contact.

The second column 504 of the contact 500 represents type fields 526, 536, 546, 556, 566, 576, 586 that specify a type of record stored for the contact. For example, text stored in the type field 536 identifies the record 532 as being for a personal phone number, and text stored in the type field 546 identifies the record 542 as being for a work phone number. Similarly, text stored in the type field 556 identifies the record 552 as being for a personal e-mail address, and text stored in the type field 566 identifies the record 562 as being for a work e-mail address.

The third column 506 of the contact 500 represents data value fields 528, 538, 548, 558, 568, 578, 588. The data value fields store the actual data used by the first device 100 to establish an electronic connection with an individual or to determine the electronic means by which the individual is establishing an electronic connection with the first device 100. The data value fields 528, 538, 548, 558, and 568, for instance, are populated with Mike Smith's personal home number, personal cell number, work phone number, personal e-mail address, and work e-mail address, respectively. When the first device 100 receives a call from the number (630) 469-8129, the first device 100 determines from the record 532 of the contact 500 that Mike Smith is calling using his personal cell phone. When the first device 100 receives an e-mail from the address mike.s@omnitech.com, the first device 100 determines from the record 562 of the contact 500 that Mike Smith is sending the e-mail using his work e-mail account.

A priority contact is defined relative to a contact that does not have priority status. For a priority contact, an electronic communication received by the first device 100 from another device or account used by the individual associated with the priority contact results in an audible alert being played on the first device 100 while a limited-interruption mode is enabled on the first device 100. An electronic communication received from an individual not associated with a priority contact does not result in an audible alert being played on the first device 100 while the limited-interruption mode is enabled on the first device 100.

For an embodiment, an audible alert on the first device 100 includes at least one of a first sound played by the first device 100 when receiving a call or a second sound played by the first device 100 when receiving a text message. The first sound, for example, is music selected by the first user whereas the second sound is an unrelated sound effect. In further embodiments, the first device 100 plays similar or dissimilar sounds in any combination for different types of electronic communications the first device 100 receives.

An individual associated with a priority contact, referred to as a priority individual, can reach the first user on the first device 100 while the first device 100 is in a limited-interruption mode. This is because the first device 100 still plays audible alerts for some or all electronic communications received from the priority individual. Not taking visual alerts into account, an individual not associated with a priority contact, referred to as a non-priority individual, cannot reach the first user on the first device 100 while the first device 100 is in a limited-interruption mode. The first device 100 suppresses audible alerts for electronic communications received from non-priority individuals.

Returning again to FIG. 3, the method 300 continues with the first device 100 enabling 308 a meeting mode during the meeting time interval. In the meeting mode, suppressing audible alerts for incoming communications from non-priority individuals keeps the first device 100 from disturbing the first user while he is in a meeting. For one embodiment, the first user manually enables the meeting mode on the first device 100 as the meeting begins. For another embodiment, the first device 100 determines the meeting has begun and automatically enables the meeting mode without input from the first user. The first device 100 determines the meeting has begun, for example, from a scheduled meeting time, from the first device 100, or a communicatively coupled device used by the first user, executing meeting software, or from detecting that the first device 100 is at a meeting location.

In some cases, a contact already exists on the first device 100 for a participant of a meeting. For such cases, the first device 100 temporarily making a contact a priority contact includes temporarily making the preexisting non-priority contact on the first electronic device 100 a priority contact. In an embodiment, the first device 100 reverts the priority contact back to the preexisting non-priority contact when a meeting time interval for the meeting concludes, expires, or otherwise ends. For example, the contact 500 for Mike Smith already exists on the first device 100 when the first device 100 determines that Mike Smith is a participant of a meeting scheduled for the first user. The first device 100 makes the contact 500 a priority contact at the beginning of the meeting time interval and reverts the priority contact back to the non-priority contact 500 at the end of the meeting time interval. Alternatively, the first device 100 makes the contact 500 a priority contact upon detecting the meeting has started and reverts the priority contact back to the non-priority contact 500 upon detecting the meeting has ended.

In other cases, a contact does not exist on the first device 100 for a participant of a meeting. For such instances, the first device 100 temporarily making a contact a priority contact includes temporarily creating a contact as a priority contact on the first device 100. In an embodiment, the first device 100 deletes the priority contact when a meeting time interval for the meeting ends. For instance, the first device 100 determines from a meeting invitation received as an e-mail that Mike Smith is a participant of a meeting scheduled for the first user. Because the first device 100 does not have a contact stored for Mike Smith, the first device 100 creates a contact for Mike Smith using contact information included in the meeting invitation or accessible from one or more databases with which the first device 100 can electronically connect. When the meeting ends, the first device 100 deletes the contact for Mike Smith because the contact was not initially programmed into the first device 100.

In another example, the first device 100 determines two weeks prior to the meeting that Mike Smith is a participant. The first device 100 responsively creates a non-priority contact for Mike Smith. In two weeks time, when the meeting begins, the first device 100 makes the non-priority contact for Mike Smith a priority contact. When the meeting ends, the first device 100 deletes the contact for Mike Smith.

The following example illustrates a benefit of the present teachings. The first user receives a meeting invitation on his smartphone 100 to a meeting for which Mike Smith is a participant. At a scheduled meeting time, the first user enters the conference room 446 to attend the meeting. The first device 100, determining that it is located in the conference room and that the meeting time interval has begun, enables a meeting mode whereby the first user and the meeting are not disturbed by audible alerts. Mike Smith is caught in backed-up traffic resulting from a road incident and is unable to make it to the meeting in time. Mike uses his smartphone 438 in an attempt to contact the first user, but his texts, calls, and e-mails fail to audibly alert the first user, who has slipped his phone in his pocket.

With the benefit of the present teachings, the contact 500 for Mike Smith is made a priority contact on the first device 100 during the meeting time interval. When Mike Smith texts, calls, or e-mails the first user, the first device 100 plays an audible alert upon receiving the communication because the contact 500 is now a priority contact on the first device 100.

In addition to prioritizing contacts for intended meeting participants, the present teachings also includes prioritizing contacts for individuals who are not intended meeting participants. Different contexts dictate the importance of these individuals having access to the first user while the first device 100 is in a limited-interruption mode. The processing element 204, for example, can be programmed to identify certain contexts and to prioritize the contacts of particular individuals based on these contexts.

For embodiments involving a first alternate context, the first device 100 receives a communication from an electronic device associated with a service provider and concerning a pending service being provided to the first user. The first device 100 determines contact information for the service provider from the communication and temporarily makes a contact for the service provider a priority contact during a meeting time interval.

In a first example, the sixth device 438 belongs to a taxi driver, working for a taxi service, who made arrangements to pick up the first user at 4:00 PM and drive him to the airport. As the taxi driver approaches the first user's place of employment, he phones the first user to let him know he is waiting outside. The first user, however, is still in a meeting with the meeting mode enabled on his smartphone 100. Because the first device 100 received contact information from the taxi service for the sixth device 438, the taxi driver's call from the sixth device 438 results in an audible alert being played on the first device 100. This is because the first device 100 temporarily made a contact for the taxi driver a priority contact during the first user's meeting.

In a second example, the sixth device 438 belongs to a delivery driver, working for a parcel delivery service, who is delivering a package to the first user. The previous day, the first device 100 received an e-mail from the delivery service indicating the delivery driver's contact information. From the contact information, the first device 100 created a contact for the delivery driver. With the meeting mode enabled on the first device 100, the first device 100 makes the contact for the delivery driver a priority contact. While the first user is in his meeting, the delivery driver calls the first user requiring directions. An audible alert is played by the first device 100 making the first user aware that he is receiving a priority call.

For embodiments involving a second alternate context, the first device 100 temporarily makes one or more contacts associated with a school attended by a child of the first user priority contacts during a meeting time interval for the first user. The first device 100, for example, has school contacts for the child's teacher, principal, school nurse, and bus driver. During school hours, the first user is in a meeting and the first device 100 enables its meeting mode. The first device 100 temporarily makes the contacts for the teacher, principal, school nurse, and bus driver priority contacts so that all of these individuals can reach the first user while he is in his meeting. The school nurse, for instance, uses the sixth device 438 to call the first device 100, which rings to alert the first user of the call.

For embodiments involving a third alternate context, the first device 100 determines an invitee invited to meet with the first user in person. An invitee includes any individual who receives an invitation to meet with the first user. While the invitation is extended, or within a time period of when the meeting is to take place, the first device 100 temporarily makes a contact associated with the invitee a priority contact while the meeting mode is enabled on the first device 100.

In a first example, the first user uses the first device 100 to invite a client to his office at 3:00 PM. The client accepts the invitation using the sixth device 438. The first device 100 parses the communications to determine that the client is an invitee and to determine contact information for the client. At 2:40 PM, while the first user is attending a meeting, the client uses the sixth device 438 to call the first user from the road to request more detailed directions. With a meeting mode enabled on the first device 100, the client's call rings through to the first user because the first device 100 has prioritized the client's contact.

In a second example, the first user invites an old friend to his new home. While making the three-hour drive, the friend has his wife call the first user on her smartphone 438. Because the wife is a passenger, she is better able to make the call. On the first device 100, the wife's contact information is associated with the friend's contact information. Both contacts, for instance, have a last name, a home address, and a home telephone number in common. Based on this association, the first device 100 temporarily makes both the friend's and the wife's contacts priority contacts while the first user is still at work in a meeting. In this way, the first device 100 plays an audible alert for communications received from either the friend's phone or the wife's phone 438.

For embodiments involving a fourth alternate context, the first device 100 detects repeated outgoing communications to a contact within a threshold time interval of a meeting time interval. Responsively, the first device 100 temporarily makes the contact a priority contact during the meeting time interval. Repeated outgoing communications to the contact indicates an elevated importance that the first user reaches an individual associated with the contact. The repeated outgoing communications occurring within the threshold time interval of the meeting time interval indicates an elevated possibility of a return communication being received by the first device 100 while the first user is in a meeting.

The first user, for example, has his car in a body shop. On the day repairs to the car are to be completed, the first user calls the body shop at 10:45 AM and again at 11:20 AM to determine what time he should pick up the car. Both times, the first user fails to reach anyone at the body shop. At 11:30 AM, the first user attends a 90-minute meeting. Having detected the two unanswered communications to the body shop within a two-hour threshold time interval of the 11:30 AM meeting, the first device 100 temporarily makes the contact for the body shop a priority contact during the 90-minute meeting so the first user is audibly alerted to a return communication from the body shop.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method performed by an electronic device for temporarily prioritizing contacts, the method comprising:

executing an application on a processor of the electronic device, the application performing:

detecting a meeting for a user of the electronic device using the processor to detect calendar data of a calendar application stored in memory on the electronic device, the meeting scheduled for a meeting time interval in the calendar application;

determining a first participant of the meeting;

temporarily making a first contact for the first participant a first priority contact during the meeting time interval, the first contact being a preexisting non-priority contact of the first participant stored in a contact record in memory of the electronic device;

enabling a meeting mode on the electronic device during the meeting time interval, including an audible alert being enabled for the first priority contact and the audible alert disabled for non-priority contacts while the meeting mode is enabled; and reverting the first priority contact back to the preexisting non-priority contact when the meeting time interval ends.

2. The method of claim 1 further comprising:

determining a second participant of the meeting;

temporarily enabling a second priority contact for the second participant during the meeting time interval, wherein the audible alert is enabled for the second priority contact while the meeting mode is enabled.

3. The method of claim 1, wherein temporarily making the first contact for the first participant the first priority contact comprises creating the first contact as the first priority contact.

4. The method of claim 3 further comprising deleting the first priority contact when the meeting time interval ends.

5. The method of claim 1, wherein the application executing on the processor of the electronic device detects the meeting and determines the first participant by parsing one or more electronic communications.

6. The method of claim 5, wherein the one or more electronic communications comprise at least one of:

an electronic-mail communication;

an electronic-chat communication; or a text-message communication.

7. The method of claim 6, wherein the one or more electronic communications comprise at least one of:

an incoming electronic communication received by the electronic device from an additional electronic device; or an outgoing electronic communication sent by the electronic device to the additional electronic device.

8. The method of claim 1, wherein the application executing on the processor of the electronic device detects the meeting and determines the first participant by accessing the calendar data of the calendar application.

9. The method of claim 8, wherein the calendar application is executing on the processor of the electronic device.

10. The method of claim 8, wherein the calendar application is executing on another electronic device.

11. The method of claim 1 further comprising:

receiving an electronic communication from an additional electronic device associated with a taxi service and concerning transportation being provided to the user;

determining, from the electronic communication, contact information for the taxi service; and temporarily making a second priority contact comprising the contact information during the meeting time interval, wherein the audible alert on the electronic device is enabled for the second priority contact while the meeting mode is enabled.

12. The method of claim 1 further comprising:

receiving an electronic communication from an additional electronic device associated with a parcel delivery service and concerning a parcel being delivered to the user;

determining, from the electronic communication, contact information for the parcel delivery service; and temporarily making a second priority contact comprising the contact information during the meeting time interval, wherein the audible alert on the electronic device is enabled for the second priority contact while the meeting mode is enabled.

13. The method of claim 1 further comprising temporarily making a second priority contact associated with a school attended by a child of the user during the meeting time interval, wherein the audible alert on the electronic device is enabled for the second priority contact while the meeting mode is enabled.

14. The method of claim 1 further comprising:

determining, from an electronic communication, an invitee invited to meet in person with the user; and temporarily making a second priority contact associated with the invitee during the meeting time interval, wherein the audible alert on the electronic device is enabled for the second priority contact while the meeting mode is enabled.

15. The method of claim 1 further comprising:

detecting repeated outgoing electronic communications to a second contact of the user occurring within a threshold time interval of the meeting time interval; and temporarily making the second contact of the user a second priority contact during the meeting time interval, wherein the audible alert on the electronic device is enabled for the second priority contact while the meeting mode is enabled.

16. An electronic device configured to temporarily prioritize contacts, the first electronic device comprising:

a memory to store contact records of the contacts associated with a user of the electronic device, the contact records including one or more forms of contacting a respective contact of the user;

a processing element configured to execute an application implemented to perform operations comprising to:

detect a meeting for the user of the electronic device using the processing element to detect the contact records stored in the memory, the meeting scheduled for a meeting time interval in a calendar application that is executable on the electronic device by the processing element;

determine a first participant of the meeting;

temporarily make a first contact for the first participant a first priority contact during the meeting time interval;

detect electronic communications to a contact of the user during the meeting time interval;

temporarily make the contact of the user a second priority contact during the meeting time interval; and enable a meeting mode on the electronic device during the meeting time interval, including an audible alert being enabled for the first priority contact and the second priority contact, and the audible alert disabled for non-priority contacts while the meeting mode is enabled.

17. The electronic device of claim 16 further comprising at least one communication interface configured to send the electronic communications to the contact of the user and receive additional electronic communications, and wherein the application is further configured to detect the meeting and determine the first participant by parsing an electronic communication sent to or received from an additional electronic device.

18. The electronic device of claim 16 further comprising at least one communication interface configured to receive, from an additional electronic device, an electronic communication associated with a service provider and concerning a pending service being provided to the user, wherein the application is further configured to:

determine, from the electronic communication, contact information for the service provider; and temporarily make a service provider priority contact comprising the contact information during the meeting time interval, wherein the audible alert on the electronic device is enabled for the service provider priority contact while the meeting mode is enabled.

19. An electronic device implemented to temporarily prioritize contacts of a user of the electronic device, the electronic device comprising:

a memory to store contact records of the contacts associated with the user of the electronic device;

a processor system configured to execute a calendar application and a program application, the program application implemented to perform operations comprising to:

determine a meeting between the user and at least one of the contacts of the user from the calendar application, the meeting scheduled for a meeting time interval;

enable a meeting mode on the electronic device during the meeting time interval without input from the user, the meeting mode including an audible alert being enabled for priority contacts during the meeting time interval;

determine contact information for a service provider from an electronic communication received from the service provider during the meeting time interval; and temporarily making the service provider one of the priority contacts during the meeting time interval effective to notify the user via the audible alert of a pending service being provided by the service provider.

20. The electronic device of claim 19, wherein the program application is implemented to disable the meeting mode on the electronic device after the meeting time interval without input from the user, and revert the service provider to a non-priority contact.

* * * * *